United States Patent
Chu (10) Patent No.: US 10,622,689 B2
(45) Date of Patent: Apr. 14, 2020

(54) HEAT RELEASING COMPOSITE AND WATER COOLING BATTERY SYSTEM INCLUDING THE SAME

(71) Applicants: Hyundai Motor Company, Seoul (KR); Kia Motors Corporation, Seoul (KR)

(72) Inventor: In-Chang Chu, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 113 days.

(21) Appl. No.: 15/725,131

(22) Filed: Oct. 4, 2017

(65) Prior Publication Data

US 2018/0191042 A1 Jul. 5, 2018

(30) Foreign Application Priority Data

Jan. 3, 2017 (KR) ........................ 10-2017-0000782

(51) Int. Cl.
| | |
|---|---|
| *H01M 2/12* | (2006.01) |
| *H01M 10/6557* | (2014.01) |
| *C09K 5/14* | (2006.01) |
| *C08K 3/04* | (2006.01) |
| *H01M 10/6567* | (2014.01) |
| *H01M 10/625* | (2014.01) |
| *H01M 10/613* | (2014.01) |
| *C08K 5/01* | (2006.01) |
| *H01M 10/653* | (2014.01) |

(Continued)

(52) U.S. Cl.
CPC .......... *H01M 10/6557* (2015.04); *C08K 3/04* (2013.01); *C08K 5/01* (2013.01); *C09K 5/14* (2013.01); *H01M 10/613* (2015.04); *H01M 10/625* (2015.04); *H01M 10/653* (2015.04); *H01M 10/6555* (2015.04); *H01M 10/6556* (2015.04); *H01M 10/6567* (2015.04)

(58) Field of Classification Search
CPC .......... H01M 10/6557; H01M 10/613; H01M 10/625; H01M 10/653; H01M 10/655; H01M 10/6556; H01M 10/6567; C08K 3/04; C08K 5/01; C09K 5/14
See application file for complete search history.

(56) References Cited

U.S. PATENT DOCUMENTS

| | | | | |
|---|---|---|---|---|
| 8,465,864 | B1 * | 6/2013 | Kwak | ................. H01M 10/625 429/120 |
| 2017/0346143 | A1 * | 11/2017 | Deser | ................. H01M 10/613 |

FOREIGN PATENT DOCUMENTS

| | | | |
|---|---|---|---|
| CN | 106654448 A | * | 5/2017 |
| JP | 2007211059 A | * | 8/2007 |
| KR | 10-1649613 B1 | | 8/2016 |

OTHER PUBLICATIONS

English machine translation of Kobayashi et al. (JP 2007211059 A) (Year: 2007).*

(Continued)

*Primary Examiner* — Jane J Rhee
(74) *Attorney, Agent, or Firm* — Morgan, Lewis & Bockius LLP (57) ABSTRACT

A heat releasing composite which is a heat releasing interface material inserted between battery cells and a cooling channel, comprising at least one of an elastomer layer including elastomer and white oil; a filler layer including a thermally conductive filler; and an insulating layer.

19 Claims, 4 Drawing Sheets

(51) Int. Cl.
*H01M 10/6556* (2014.01)
*H01M 10/6555* (2014.01)

(56) References Cited

OTHER PUBLICATIONS

English machine translation of Cao et al. (CN 106654448 A) (Year: 2017).*

* cited by examiner

HEAT RELEASING COMPOSITE AND WATER COOLING BATTERY SYSTEM INCLUDING THE SAME

CROSS-REFERENCE TO RELATED APPLICATIONS

The present application claims priority to Korean Patent Application No. 10-2017-0000782, filed on Jan. 3, 2017, the entire contents of which is incorporated herein for all purposes by this reference.

BACKGROUND OF THE INVENTION

Field of the Invention

The present invention relates to a heat releasing composite and a water cooling battery system including the same, and more particularly, to a heat releasing composite capable of maximizing cooling performance by effectively transferring heat transferred by cohesion to a water cooling channel and a water cooling battery system using the same.

Description of Related Art

Due to a social issue such as suppression of harmful substance emission due to global warming, an interest in a green car has been increased. To keep pace with the situations, optimization of battery performance which may be considered as an engine of the green car is an important factor in a future vehicle. To achieve the optimization of the battery performance, optimally maintaining driving environment of the battery is an important factor to improve the performance of the green car.

In the case of an electric vehicle, as reliability and stability of a battery system are the most important factor which determines marketability of the electric vehicle, a temperature of the battery system needs to be maintained at 35° C. to 40° C. which is an appropriate temperature range to prevent the reduction in the battery performance due to a change in various external temperatures. For this purpose, a need exists for a heat control system for a pouch cell module capable of maintaining the appropriate temperature under low temperature environment while having excellent heat releasing performance under a general weather condition.

Most of the research activities are aimed at improving thermal conductivity by applying a spherical filler and a general carbon-based filler as a high heat releasing composite which is currently being developed as a material having excellent heat releasing performance. However, the filler shows the improvement in thermal conductivity characteristics at a filler content of at least 70%. In this case, the filler has poor formability, and therefore has a limitation of modularization.

Further, the filler has a limitation of improvement in horizontal thermal conductivity and therefore is hardly applied to components requiring the horizontal thermal conductivity.

Therefore, to overcome the phenomenon that heat transfer characteristics due to air and foreign materials at an interface are reduced at the time of transferring heat between heterogeneous materials, a thermal interface material (TIM) has been applied. However, the TIM has the horizontal thermal conductivity characteristics that are equal to or less than 3 W/mK, and therefore has a problem in that there is a limitation of effectively transferring heat and an expensive functional filler needs to be used.

Accordingly, there is a gap of a certain thickness between the two heterogeneous materials, and therefore it is necessary to lower hardness of the gap portion and use a thermal interface material having a low specific gravity to maximize cohesion at the gap portion to thereby improve the heat transfer characteristics. However, in the existing commercial materials, there is no thermal interface material satisfying the two characteristics.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a heat releasing composite configured for effectively transferring heat between heterogeneous components having a gap of several mm in thickness by minimizing a specific gravity of a thermal interface material (TIM) to 50% or less, compared to the existing TIM to minimize a burden on a weight upon mounting of the components to satisfy low specific gravity/low hardness properties compared to the existing commercial TIM.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an exemplary embodiment of the present invention, a heat releasing composite is a heat releasing interface material inserted between battery cells and a cooling channel and is configured to comprise at least one of an elastomer layer including elastomer and white oil; a filler layer including a thermally conductive filler; and an insulating layer.

In accordance with another exemplary embodiment of the present invention, there is provided a water cooling battery system in which the heat releasing composite is inserted between a plurality of battery cells and a cooling channel.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
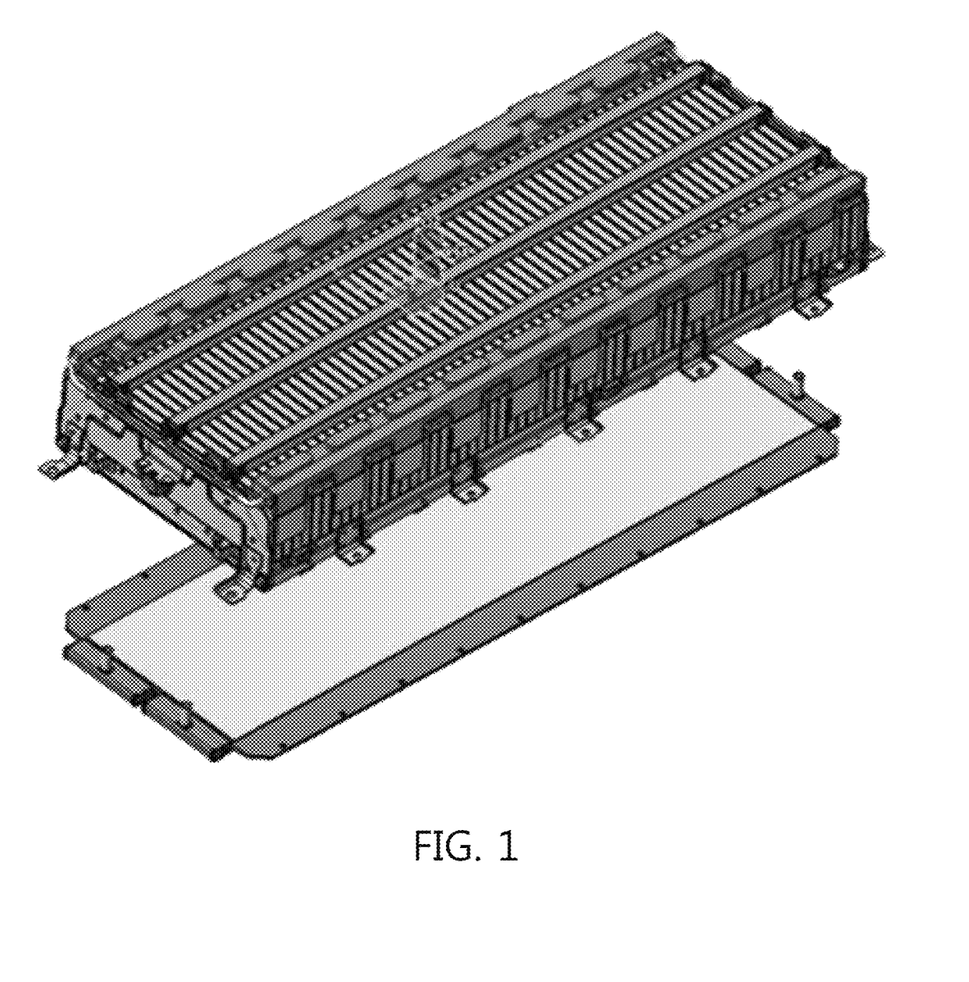
FIG. 1 is a view illustrating a configuration of a water cooling battery system according to an exemplary embodiment of the present invention.

As illustrated in FIG. 1, in a case of a water cooling battery system applied to an electric vehicle (EV), one pack is configured to include a battery cell of an upper portion and a water cooling channel through which cooling water for cooling a lower portion may pass. The battery cell of the upper portion has a structure in which one cell cover is provided with two battery cells and the respective cell bundles are connected in series. For this reason, the battery cell has a structure in which steps of the respective cell bundles are generated at the time of assembly and thus it is difficult to effectively transfer heat generated during charging and discharging to the cooling channel. Therefore, to overcome the disadvantages, a thermal interface material configured for removing the step between neighboring cell bundles is required. The existing commercial material has hardness configured for solving the step and thus effectively transfer heat, but uses a silicon-based matrix to have a specific gravity of about 2.4~2.6 g/cm$^3$, which may lead to increase a weight of a system upon the use of the material.

To overcome the disadvantages in an exemplary embodiment of the present invention, a material design having at least one of three layers is performed to maximize characteristics of each layer, developing a multi-functional heat releasing material. A detailed configuration of the present invention is as follows.

Figure 2:
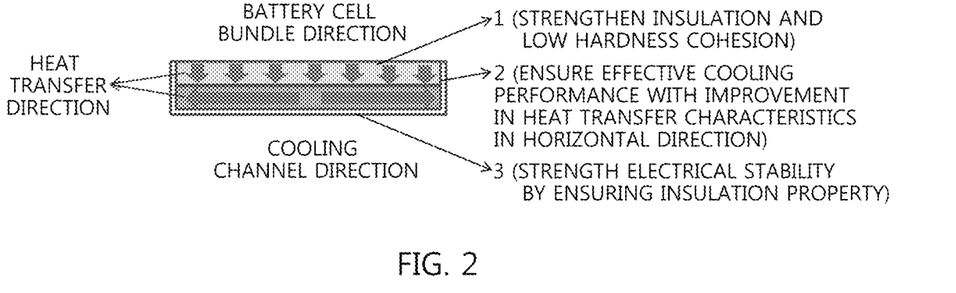
FIG. 2 is a schematic view illustrating a heat releasing composite according to an exemplary embodiment of the present invention.

The heat releasing composite of the present invention is a heat releasing interface material inserted between battery cells and a cooling channel and is configured to comprise at least one of an elastomer layer including elastomer and white oil, a filler layer including a thermally conductive filler, and an insulating layer. An example of a detailed schematic view of the heat releasing composite of the present invention is illustrated in FIG. 2.

First, the heat releasing composite material of the present invention includes the elastomer layer.

The elastomer layer includes a thermally conductive elastomer having a low hardness property, and there is a need to overcome a step in a battery cell bundle in the water cooling battery system to ensure a cohesion characteristic between the battery cell bundle and the elastomer layer.

For this purpose, a basic matrix material of the elastomer layer may include at least one selected from the group consisting of a styrene-based resin, an olefin-based resin, a polyester-based resin, a polyamide-based resin, a styrene-butadiene-styrene block copolymer (SBS), a styrene-butadiene-ethylene-styrene block copolymer (SBES), and a styrene-isoprene-styrene block copolymer (SIS), At least one selected from the group consisting of a styrene-butadiene-styrene block copolymer (SBS), styrene-butadiene-ethylene-styrene block copolymer (SBES), and a styrene-isoprene-styrene block copolymer (SIS), and the basic matrix material including 10 to 15 wt % of styrene in the copolymer may be used.

Figure 3:
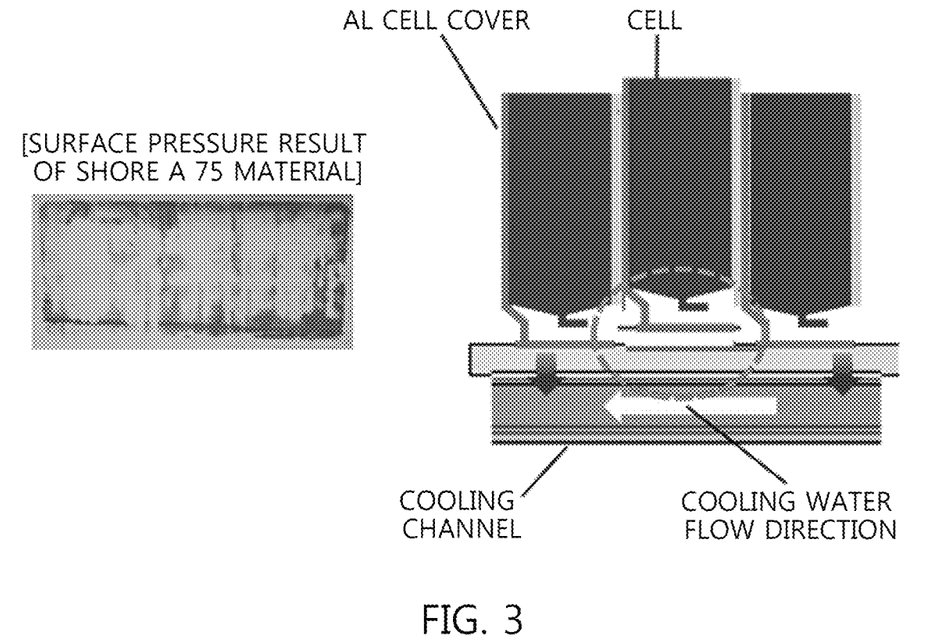
FIG. 3 is a schematic view illustrating a step of the water cooling battery system using the heat releasing composite according to the exemplary embodiment of the present invention.
Figure 4:
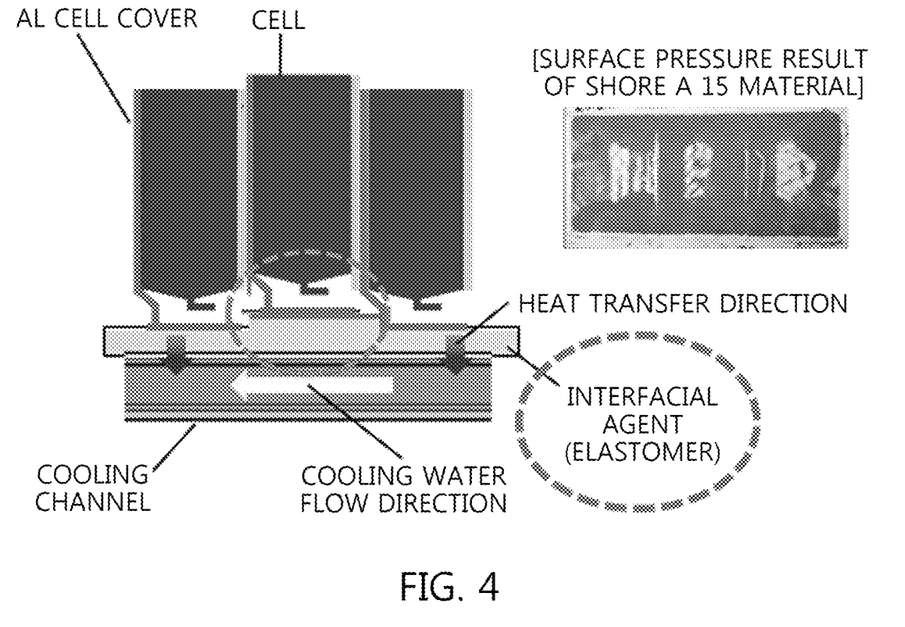
FIG. 4 is a schematic view illustrating another step of the water cooling battery system using the heat releasing composite according to the exemplary embodiment of the present invention.

In addition, the elastomer layer includes 20 to 30 wt % of white oil with respect to the total weight of the elastomer layer to control the hardness. By adjusting the content of the white oil, the hardness from Shore A 75 to Shore A 15 may be controlled. For example, when the hardness of the elastomer is the Shore A 75, as illustrated in FIG. 3, a step is formed between the battery cell bundle and the elastomer layer of the heat releasing composite material of the present invention and thus the cohesion problem is caused, such that the heat transfer may not be smoothly made. However, when the hardness of the elastomer is the Shore A 15, as illustrated in FIG. 4, a step is not formed between the battery cell bundle and the elastomer layer of the heat releasing composite material of the present invention due to the elasticity of the elastomer layer and thus the cohesion problem is not caused, such that the heat transfer may be smoothly made.

Figure 5:
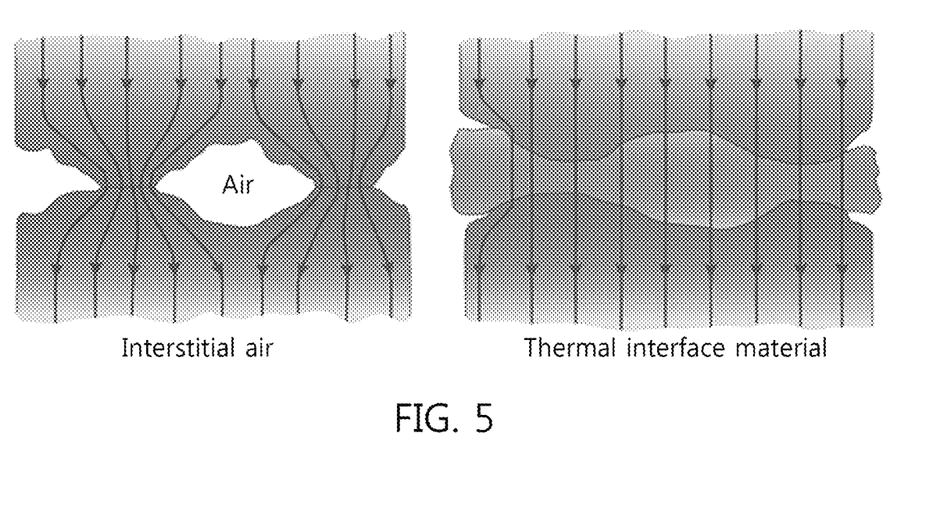
FIG. 5 is a schematic view illustrating a heat transfer mechanism of the heat releasing composite according to the exemplary embodiment of the present invention.

As described above, as the cohesion characteristic of the heat releasing composite of the present invention is improved, as illustrated in FIG. 5, the heat transfer effect in terms of the thermal interface material (TIM) may be improved.

In addition, the elastomer layer may further include an amorphous inorganic filler for lowering hardness and improving insulating performance. When the amorphous inorganic filler is used, it is possible to prevent the increase in hardness that is caused when the existing plate-like filler is used.

As the amorphous inorganic filler, at least one amorphous inorganic filler selected from the group consisting of boron nitride (BN), alumina, silica, Al metal filler, Cu metal filler, Fe metal filler, Ni metal filler and MgO may be used.

In addition, the elastomer layer may further include random PP or PE to improve hardness. When the random PP or PE is further included as described above, the problem of an increase in specific gravity with a decrease in hardness due to the inclusion of white oil may be solved. In addition, as the random PP or PE is distributed in a matrix of the elastomer layer, and thus lowers crystallinity to serve as an amorphous shape and exhibit properties suitable for plastic deformation. The random PP or PE may be included as 0.01 to 1 wt % with respect to the total weight of the elastomer layer.

The elastomer layer may be formed to have a thickness to ensure the cohesion characteristic between the battery cell bundle and the elastomer layer to overcome to overcome the step of a battery cell bundle in the water cooling battery system, preferably, may have a thickness of 0.5 to 1.5 mm.

Further, the heat releasing composite of the present invention includes the filler layer.

In the heat releasing material of the present invention, the filler layer is designed to improve the heat transfer characteristics in a horizontal direction thereof to uniformly and rapidly the heat transferred from the elastomer to the cooling channel in the water cooling battery system.

For this purpose, the filler layer may have a conductivity of 1.5 W/mK or more in a vertical direction thereof, and may have a thermal conductivity of 6.0 W/mK or more in a horizontal direction thereof.

The filler layer includes a thermally conductive filler as a layer designed to be able to effectively, uniformly, and rapidly transfer the heat transferred from the elastomer layer to the water cooling channel. As the thermally conductive filler, a carbon-based plate-like filler or a metal-based plate-like filler like aluminum may be used. When the plate-like filer is applied, the carbon-based plate-like filler having a property that a large area is disposed in a horizontal direction thereof may be used.

The filler layer may include the same material as the elastomer layer described above, minimizing an interfacial thermal resistance and improving durability. The filler layer may include at least one selected from the group consisting of a styrene-based resin, an olefin-based resin, a polyester-based resin, a polyamide-based resin, a styrene-butadiene-styrene block copolymer (SBS), a styrene-butadiene-ethylene-styrene block copolymer (SBES), and styrene-isoprene-styrene block copolymer (SIS), in addition to the carbon-based plate-like filler.

The thickness of the filler layer is not particularly limited, but preferably, it may be more effective that the thickness of the filler layer 10 is 10 times or greater than that of the insulating layer.

Further, the heat releasing composite of the present invention includes the insulating layer.

The insulating layer may have an electric insulation property of the heat releasing composite by insulating the conductive filler layer according to the application of the thermally conductive filler.

For this purpose, the insulating layer is designed to apply the same matrix as the elastomer layer and the filler layer to maximize the adhesion at the interface during lamination to minimize the thermal resistance at the interface and ensures the insulation property to be responsible for the overall insulation property together with the insulation with the filler layer.

To ensure the insulation property, the insulating layer may include the same material as the elastomer layer described above, minimizing the interfacial thermal resistance and improving the durability. The insulating layer may include at least one selected from the group consisting of a styrene-based resin, an olefin-based resin, a polyester-based resin, a polyamide-based resin, a styrene-butadiene-styrene block copolymer (SBS), and a styrene-butadiene-ethylene-styrene block copolymer (SBES), and styrene-isoprene-styrene block copolymer (SIS), in addition to the carbon-based plate-like filler.

Further, the insulating layer may have a thickness between 10 and 200 μm to prevent the heat transfer characteristics from being reduced.

Further, in the heat releasing composite of the present invention, the elastomer layer, the filler layer, and the insulating layer includes the matrix of the same material, and thus may interface-adhere without a separate adhesive component.

The interface adhesion is possible, and therefore the heat releasing composite of the present invention may minimize the occurrence of the thermal resistance and minimize the movement of the white oil component of the elastomer to the filler layer.

In an exemplary embodiment of the present invention, the lamination method uses the same method as that of the related art of applying heat/pressure, but may minimize the change in the thickness of the material after and before the lamination by heat/pressure based on the material design (composition and content control of the matrix) that lowers hardness while maintaining the elastomer characteristics. Further, the existing commercial materials have a problem of ensuring durability performance in long-term use because they do not have a restoring force when being applied with the pressure. However, the present technology uses a material ensuring elastomer characteristics while lowering hardness, and therefore may minimize a deviation in thickness before and after the lamination.

Therefore, it is possible to ensure mass productivity based on the design of materials that may be manufactured using a general method.

In addition, like silicon-based ceramic filler heat releasing material, the general commercial material has an advantage of lowering the hardness but has the large specific gravity. Therefore, when a small amount of commercial material is applied, it does not cause any problems but when a large amount of commercial material is applied, it has a problem in that a load of a system is increased. As a result, there are no products configured for lowering the hardness and the specific gravity using a material that is produced as a current commercial product.

However, according to an exemplary embodiment of the present invention, it is possible to effectively induce the cohesion at a portion which the hardness is decreased and the heat transfer is required and make the heat transfer speed rapid at the core portion and design a material configured for satisfying the overall electrical stability by use of an insulating layer.

Further, various aspects of the present invention are directed to providing the water cooling battery system in which the heat releasing composite is inserted between a plurality of battery cells and a cooling channel.

The heat generated from the battery is transferred to the elastomer layer such that the elastomer layer of the heat releasing composite is in contact with the plurality of battery cells, and the so transferred heat is transferred again in the vertical and horizontal directions thereof. Since the heat releasing composite of the present invention has the improved heat transfer characteristics in the horizontal direction thereof, the heat transferred from the elastomer layer may be uniformly and rapidly transferred to the cooling channel in the water cooling battery system.

As long as the water cooling battery system is the water cooling battery system requiring the heat transfer, the water cooling battery system may be used without being limited. The water cooling battery system may be applied to the battery system of the EV vehicle.

Hereinafter, the present invention will be described in more detail on the basis of the embodiments. However, the embodiments of the present invention described below are only an example and therefore the scope of the present invention is not limited to these embodiments. The scope of the invention is set forth in the appended claims, and is intended to cover all modifications within the equivalent meaning and scope of the appended claims. Further, "%" and "unit" representing the content in the following examples and comparative examples are on a mass basis unless otherwise specified.

Example 1 and Comparative Example 1:
Manufacturing of Heat Releasing Material

Example 1

75 wt % of elastomer (G1645M, Kraton) and 25 wt % of white oil (Process Oil P, Mi-Chang oil) were mixed to prepare a composition for preparing the elastomer layer.

35 wt % of carbon-based plate-like filler (EGG, TIMCAL) was mixed with 65 wt % of elastomer (G1645M, Kraton) to prepare the composition for preparing the filler layer.

The composition for preparing the filler layer was applied at a thickness of 1 mm on the insulating layer (G1645M, Kraton) having a thickness of 100 μm and then dried and the composition for preparing the elastomer layer was applied thereon at a thickness of 1 mm and dried, manufacturing the heat releasing material.

Comparative Example 1

Generally, a CoolT™ TIM material was used as a generally used heat releasing material.

Experimental Example

Physical properties of the heat releasing material according to Example 1 and Comparative Example 1 were measured and the measured results were shown in the following Table 1.

TABLE 1

|  | Example 1 | Comparative Example 1 | Remarks (Measurement criteria) |
|---|---|---|---|
| Material property | Thermoplastic elastomer | Silicons | Durability |
| Hardness | 15 | 10 | Cohesion characteristic (ASTM D2240) |
| Density (g/cm³) | 1.1~1.3 | 2.4/2.6 | Weight reduction |
| Thickness (T) | Thickness control | 2T/3T |  |
| Thermal Conductivity (W/mk) | Horizontal direction: 6 | 2 | Heat transfer characteristic (ASTM D5470) |
| Breakdown Voltage (kV) | 6 | 5.8 | Insulation property |
| Thermal Stability (° C.) | −40~140° C. | −40~150° C. | Environmental durability |
| RoHS | No detection | No detection | Whether there is harmful substance |

The heat releasing composite according to the exemplary embodiment of the present invention is a material configured for effectively transferring heat between the heterogeneous components having the thick gap and the large area, in which the composite having the low hardness is applied to the top portion thereof to overcome the step of the upper component as much as possible to make the cohesion between the battery cell and the heat releasing material excellent and the composite having the high thermal conductivity characteristics is applied to an inside thereof to exhibit the heat transfer effect as much as possible to effectively transfer heat transferred due to the cohesion to the water cooling channel to maximize the cooling performance, such that the composite may have the optimal heat transfer effect. Further, it is possible to reduce the weight of the battery system, save costs (40% or more), and improve the battery performance by use of the composite.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heat releasing composite which is a heat releasing interface material inserted between battery cells and a cooling channel, the heat releasing composite comprising at least one of:
    an elastomer layer including elastomer and white oil;
    a filler layer including a thermally conductive filler; and
    an insulating layer having an electric insulation property,
    wherein contents of the elastomer and the white oil are adjusted to lower a thickness of the elastomer layer so that a step between a battery cell bundle and the elastomer layer is prevented, wherein the elastomer layer, the filler layer, and the insulating layer include a same matrix, and wherein the elastomer layer, the filler layer, and the insulating layer are interface-adhered without an adhesive component.

2. The heat releasing composite of claim 1, wherein the elastomer includes at least one selected from the group consisting of a styrene-based resin, an olefin-based resin, a polyester-based resin, a polyamide-based resin, a styrene-butadiene-styrene block copolymer (SBS), and a styrene-butadiene-ethylene-styrene block copolymer (SBES), and styrene-isoprene-styrene block copolymer (SIS).

3. The heat releasing composite of claim 1, wherein the elastomer includes at least one selected from the group consisting of a styrene-butadiene-styrene block copolymer (SBS), a styrene-butadiene-ethylene-styrene block copolymer (SBES), and styrene-isoprene-styrene block copolymer (SIS) and a content of styrene ranges from 10 to 15 wt % in the copolymer.

4. The heat releasing composite of claim 1, wherein the white oil is included in the range of 20 to 30 wt % with respect to a total weight of the elastomer layer.

5. The heat releasing composite of claim 1, wherein the elastomer layer further includes an amorphous inorganic filler.

6. The heat releasing composite of claim 5, wherein the amorphous inorganic filler is at least one amorphous inorganic filler selected from the group consisting of boron nitride (BN), alumina, silica, Al metal filler, Cu metal filler, Fe metal filler, Ni metal filler and MgO.

7. The heat releasing composite of claim 1, wherein the elastomer layer further includes a random PP or PE.

8. The heat releasing composite of claim 1, wherein the elastomer layer has a hardness of Shore A 75 to Shore A 15.

9. The heat releasing composite of claim 1, wherein the thickness of the elastomer layer ranges from 0.5 to 1.5 mm.

10. The heat releasing composite of claim 1, wherein the thermally conductive filler is a carbon-based plate-like filler or a metal-based plate-like filler.

11. The heat releasing composite of claim 10, wherein the thermally conductive filler is a carbon-based plate-like filler.

12. The heat releasing composite of claim 1, wherein the filler layer has a thermal conductivity of 1.5 W/mK or more in a vertical direction thereof.

13. The heat releasing composite of claim 1, wherein the filler layer has a heat conductivity of 6.0 W/mK or more in a horizontal direction thereof.

14. The heat releasing composite of claim 1, wherein the thickness of the filler layer is 10 times or greater than that of the insulating layer.

15. The heat releasing composite of claim 1, wherein the insulating layer includes at least one selected from the group consisting of a styrene-based resin, an olefin-based resin, a polyester-based resin, a polyamide-based resin, a styrene-butadiene-styrene block copolymer (SBS), and a styrene-butadiene-ethylene-styrene block copolymer (SBES), and styrene-isoprene-styrene block copolymer (SIS).

16. The heat releasing composite of claim 1, wherein the thickness of the insulating layer ranges from 10 to 200 μm.

17. A water cooling battery system in which the heat releasing composite of claim 1 is inserted between a plurality of battery cells and the cooling channel.

18. The water cooling battery system of claim 17, wherein the elastomer layer of the heat releasing composite is in contact with the plurality of battery cells.

19. The water cooling battery system of claim 17, wherein the water cooling battery system is used in a battery system of an electric vehicle.

* * * * *